US011923908B2

(12) United States Patent
Aflatouni et al.

(10) Patent No.: US 11,923,908 B2
(45) Date of Patent: Mar. 5, 2024

(54) INTEGRATED COHERENT RECEIVER WITH OFF PLL BANDWIDTH DEMODULATION

(71) Applicant: The Trustees of the University of Pennsylvania, Philadelphia, PA (US)

(72) Inventors: Firooz Aflatouni, Penn Valley, PA (US); Zhe Xuan, Newark, DE (US)

(73) Assignee: The Trustees of the University of Pennsylvania, Philadelphia, PA (US)

(*) Notice: Subject to any disclaimer, the term of this patent is extended or adjusted under 35 U.S.C. 154(b) by 173 days.

(21) Appl. No.: 17/698,260

(22) Filed: Mar. 18, 2022

(65) Prior Publication Data

US 2022/0321230 A1 Oct. 6, 2022

Related U.S. Application Data

(60) Provisional application No. 63/163,109, filed on Mar. 19, 2021.

(51) Int. Cl.
*H04B 10/61* (2013.01)
*H04B 10/50* (2013.01)
*H04B 10/54* (2013.01)
*H04L 7/00* (2006.01)
*H04L 7/033* (2006.01)

(52) U.S. Cl.
CPC ......... *H04B 10/541* (2013.01); *H04B 10/503* (2013.01); *H04B 10/616* (2013.01); *H04L 7/0075* (2013.01); *H04L 7/0331* (2013.01)

(58) Field of Classification Search
CPC .... H04B 10/61; H04B 10/612; H04B 10/615; H04B 10/616; H04B 10/6165; H04B 10/63–65

See application file for complete search history.

(56) References Cited

U.S. PATENT DOCUMENTS

| 4,783,852 A * | 11/1988 | Auracher | H04B 10/61 398/203 |
| 5,573,012 A | 11/1996 | McEwan | |
| 6,704,375 B1 * | 3/2004 | Serbe | H04B 10/60 398/187 |

(Continued)

OTHER PUBLICATIONS

"LifeWave Biomedical is developing a connected health solution that improves the clinical management of patients living with congestive heart failure (CHF) in hospital, ambulatory, and home settings," retrieved at https://www.lifewavebiomed.com/, retrieved on Jun. 22, 2022, p. 1.

(Continued)

*Primary Examiner* — Nathan M Cors
(74) *Attorney, Agent, or Firm* — BakerHostetler

(57) ABSTRACT

Provided are methods for optical communication, comprising: generating a phase difference signal with heterodyne or homodyne phase-locked-loop (PLL) from between an optical input signal and a local laser source; controlling the local laser source with the phase difference signal; demodulating the optical input signal using the local laser source as a carrier signal to generate a baseband output signal; and controlling the heterodyne or homodyne PLL and the demodulation with an electrical oscillator signal. Also provided are related methods.

20 Claims, 4 Drawing Sheets

(56) References Cited

U.S. PATENT DOCUMENTS

| | | | |
|---|---|---|---|
| 8,306,436 B2* | 11/2012 | Prat Goma | H04B 10/63 398/206 |
| 8,306,438 B2 | 11/2012 | Deczky et al. | |
| 8,805,206 B2 | 8/2014 | Roberts et al. | |
| 9,647,753 B1 | 5/2017 | Kurisu et al. | |
| 2007/0071456 A1* | 3/2007 | Chen | H04B 10/61 398/204 |
| 2010/0080564 A1* | 4/2010 | Fujii | H04B 10/63 398/115 |

OTHER PUBLICATIONS

Chu et al., "A CMOS UWB Camera with 7×7 Simultaneous Active Pixels", IEEE International Solid-State Circuits Conference, Feb. 2008, pp. 120-121, 600.

Ma. Y. et al., "Ultralow loss single layer submicron silicon waveguide crossing for SOI optical interconnect", Optics Express, vol. 21, Issue 24, 2013, pp. 29374-29382.

Novack et al., "A 30 GHz silicon photonic platform," in Proc. SPIE 8781, Integrated Optics: Physics and Simulations, 2013, pp. 4.

Staderini. E.M., "UWB radars in medicine," IEEE Aerospace and Elec-tronic Systems Magazine, vol. 17, Issue 1, 2002, pp. 13-18.

Tan K-W. et al., "A 79GHz UWB pulse-compression vehicular radar in 90nm CMOS," in Microwave Symposium Digest (MTT), vol. 1, No. 3, Jun. 2012, pp. 3.

Yong. X. et al., "An Overview of Ultra-Wideband Technique Application for Medial Engineering," IEEE/ICME International Conference on Complex Medical Engineer-ing(CME), Beijing, May 2007, pp. 408-411.

\* cited by examiner

INTEGRATED COHERENT RECEIVER WITH OFF PLL BANDWIDTH DEMODULATION

RELATED APPLICATIONS

The present application claims priority to and the benefit of U.S. patent application No. 63/163,109, "Integrated Coherent Receiver With Off PLL Bandwidth Demodulation" (filed Mar. 19, 2021), the entirety of which application is incorporated herein by reference for any and all purposes.

BACKGROUND

Wavelength division multiplexing on-off-keying (WDM OOK) is the predominant method used for fiber optics communication since the 1990s. Electrical signals are converted to laser light, which is blinked on and off for transmission through fiber. On the receiving end, a photodiode converts the light back to an electrical signal. Existing wavelength division multiplexing on-off-keying systems suffer from a requirement for high incident power at the receiver of the received optical signal, which may limit transmission distance, and additionally suffer from a saturated optical spectral. Accordingly, there is a need in the art for improved such systems.

SUMMARY

In meeting the described long-felt needs, the present disclosure first provides methods for optical communication, comprising: generating a phase difference signal with heterodyne or homodyne phase-locked-loop (PLL) from between an optical input signal and a local laser source; controlling the local laser source with the phase difference signal; demodulating the optical input signal using the local laser source as a carrier signal to generate a baseband output signal; and controlling the heterodyne or homodyne PLL and the demodulation with an electrical oscillator signal.

The present disclosure also provides systems for optical communication, comprising: a heterodyne or homodyne PLL controlling a local laser source based on input from the local laser source and an optical input signal; an optical demodulator for demodulating the optical input signals using the local laser source as a carrier signal to generate a baseband output signal; and an electrical oscillator configured to control the heterodyne or homodyne PLL and control the optical demodulator.

Also provided are systems, comprising: a local laser source; an electrical oscillator; a second-order polyphaser shift filter configured to filter a signal from an electrical oscillator and generate differential I and Q signals; and a heterodyne or homodyne PLL controlled by the differential I and Q signals and configured to measure the phase difference between the local laser source and an optical input signal.

BRIEF DESCRIPTION OF THE DRAWINGS

Various non-limiting embodiments are further described with reference to the accompanying drawings in which.

DETAILED DESCRIPTION OF ILLUSTRATIVE EMBODIMENTS

Figure 1:
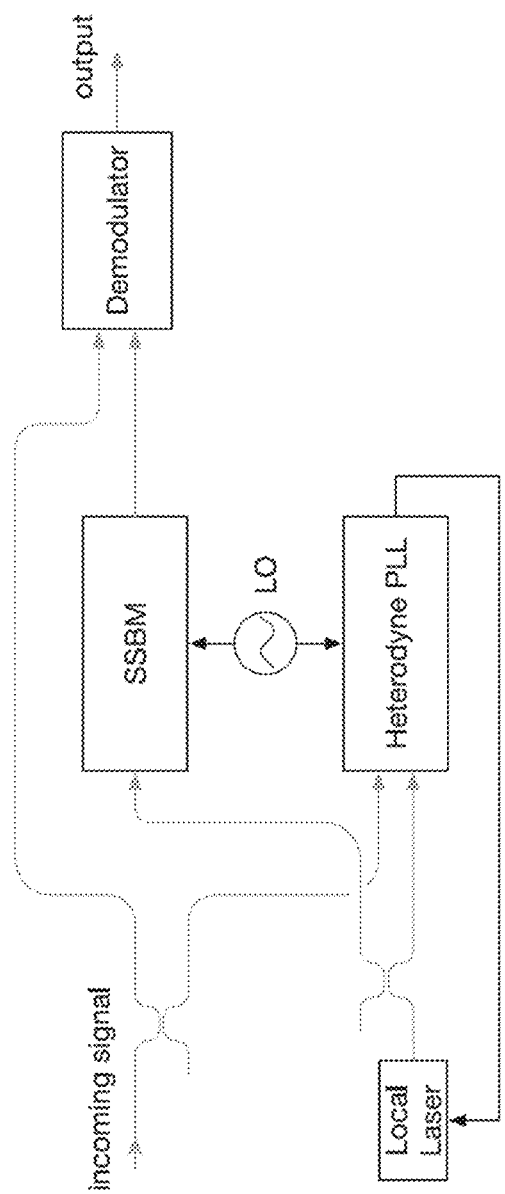
FIG. 1 is an example optical receiver.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps may be performed in any order.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range. In addition, the term "comprising" should be understood as having its standard, open-ended meaning, but also as encompassing "consisting" as well. For example, a device that comprises Part A and Part B may include parts in addition to Part A and Part B, but may also be formed only from Part A and Part B.

Coherent optical communications techniques are presented, where a receiver tracks the phase of an optical carrier signal. A local laser and electrical oscillator are employed to track the phase of the incoming signal and reduce noise in the detected communications signal. The resulting device allows for high speed data processing with low power consumption.

Coherent communications techniques have been deployed for other types of non-optical communication. For example, coherent communications techniques have been deployed extensively in Wi-Fi and cellular networks during the past two decades. However, the high bandwidth potential of coherent optical techniques has not previously been feasible in a low power receiver in part due to the inevitable noise in real optical systems. Coherent optics use properties of the light, such as amplitude and phase, to impart more data into the transmission, as compared to WDM OOK techniques.

The techniques described here include a receiver that generates a phase difference signal with phase-locked-loop (PLL), such as a heterodyne or homodyne PLL, indicating the difference in phase between a local laser source and the carrier signal in a received optical input signal. The phase of the local laser source may be controlled via the phase difference signal. The received optical signal may be demodulated using the local laser source. Both the PLL and the demodulation process may be controlled by an electrical oscillator signal. In some embodiments of the PLL, the optical input signal may be combined with the local laser to generate a beating photocurrent, and the beating photocurrent may be converted to a first electrical signal, for example at a diode. The electrical oscillator signal may be filtered to generate differential I and Q signals, for example with a polyphaser filter or other hybrid quadrature generator. The first electrical signal may then be combined with the differential I signal to generate a second electrical signal, which may then be filtered with a controllable active filter and used to generate the phase difference signal. In some embodiments, the PLL may be enabled or disabled based on the differential Q signal.

In some embodiments, the signal-sideband (SSB) demodulation may be used. The local laser source maybe modulated with a single-sideband modulator to generate a modulated local carrier signal, and the received optical input signal may be demodulated with the modulated local carrier signal. The SSB demodulator may include balanced nested Mach-Zehnder modulators, and phase differences of the Mach-Zehnder modulators may be tuned based on the differential I and Q signals generated by filtering the electrical oscillator signal. The phase differences may be tuned by driving thermal heaters or carrier-injection-based modulators with the differential I and Q signals.

FIG. 1 is an example optical receiver. In FIGS. 1-4, electrical signals appear as black lines, while optical signals appear as orange lines. In FIG. 1, an incoming optical signal is split to feed an optical PLL and a demodulator. A local laser is split to feed both a modulator and the PLL. The PLL generates a control signal to control the local laser. The modulator generates local carrier signal that the demodulator uses to demodulate the incoming optical signal into a baseband signal as output. As depicted, the PLL may be a heterodyne PLL, though a homodyne PLL may be used in alternate embodiments. As depicted, the modulator may be a signal-sideband modulator (SSBM). A local electrical oscillator may be used to control both the modulator and the PLL. The electrical oscillator signal may operate at a lower frequency than the optical carrier signal. For example, the optical carrier signal (and local laser) may operate around 200 THz, while the electrical oscillator may operate around 1 GHz. By using the lower frequency electrical oscillator to control both the PLL and the demodulation, low frequency noise, such as errors in the PLL electronics, may be reduced.

Coherent optical communication systems, such as those described here, are advantageous over prior wavelength division multiplexing on-off-keying (WDM OOK) systems. WDM OOK systems suffer from a requirement for high incident power at the receiver of the received optical signal, which may limit transmission distance, and additionally suffer from a saturated optical spectral. In contrast, coherent optical communication systems, such as those described here, may provide comparatively a much lower sensitivity to the power of the received optical signal, theoretically down to the quantum limit, and further, coherent optical systems may provide higher bandwidth efficiency.

The coherent optical system described also has advantages over some other coherent optical communication systems. Prior proposed coherent optical receiver architectures have included a power hungry optical analog-to-digital converter and digital signal processor (ADC/DSP), where the DSP processing speed must be no smaller than the baseband data rate received. Systems described here do not require a DSP for demodulation, and hence speed and power requirements for such a processor are not a constraint on the systems described here. Instead in FIG. 1, a heterodyne PLL tracks the phase change of the incoming signal and to suppress phase noise of the local laser source, thus eliminating the need for a DSP. The SSBM is then employed to shift the output frequency of the local laser to the carrier frequency. In some embodiments, the optical functional blocks in FIG. 1 may be implemented on-chip for good optical phase coherence. In the case of quadrature phase-shift keying (QPSK) input, the decoded output would be amplitude modulated, and a high-speed limiter could be used to extract the data in the demodulator. In addition, because the optical PLL runs largely independent of the high-speed modulation, the demodulation speed of this architecture is, in principle, only limited by the speed of the limiter.

Figure 2:
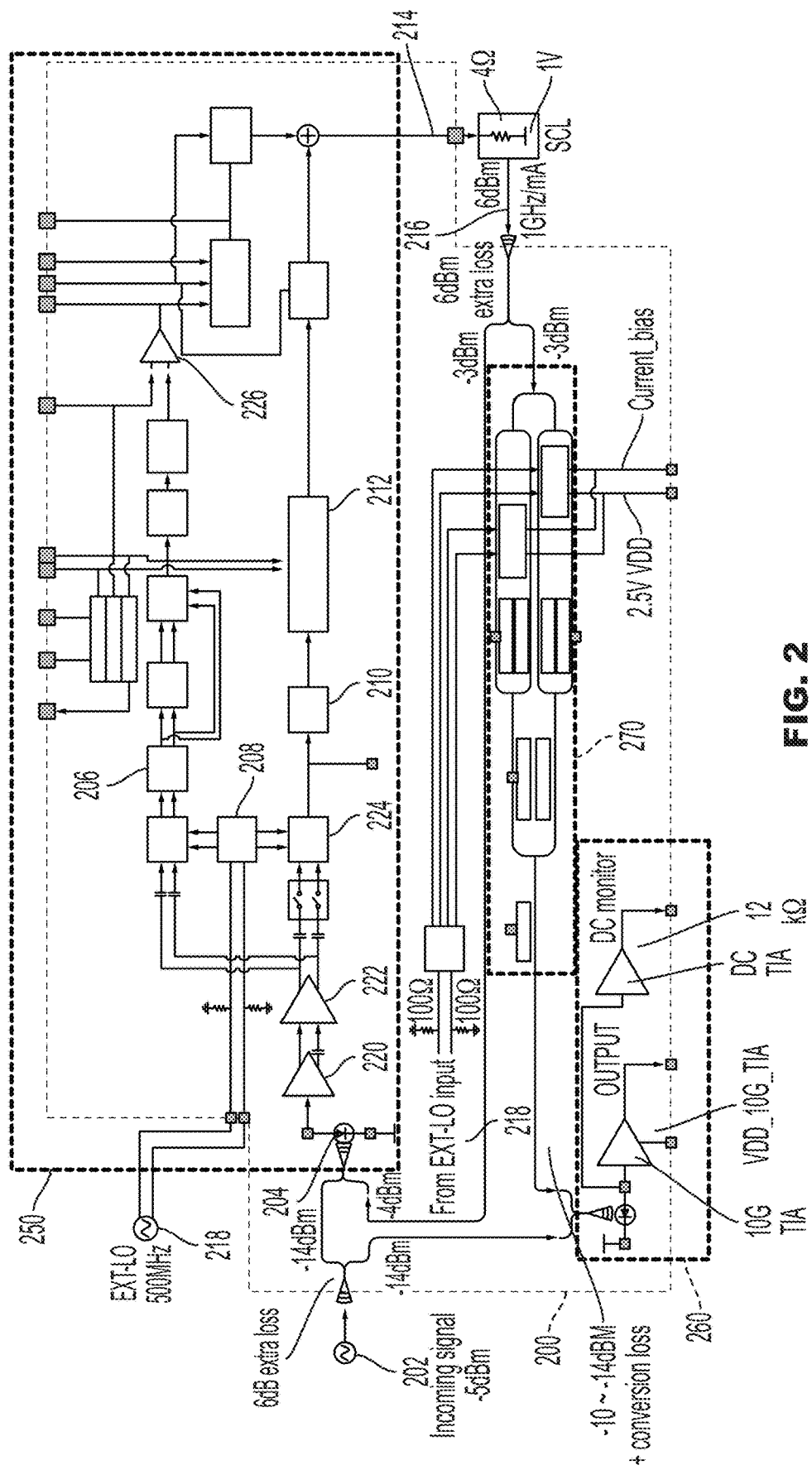
FIG. 2 is an example optical receiver.

FIG. 2 is an example optical receiver 200. Optical receiver 200 includes PLL 250, demodulator 260, and SSB modulator 270, and is depicted along with a local oscillator 218, incoming optical communications signal 202, and local laser output 216. In some embodiments, elements of optical receiver 200 may be implemented on a single integrated circuit chip. An incoming optical communications signal 202 is split and then combined with a local laser output 216, generating the beating photocurrent for the PLL 250 at photodiode 204. In the PLL, the photocurrent is converted into the voltage signal by a TIA 220, and is further amplified by a pre-amp 222. A second-order poly-phase filter 208 generates differential I-Q signals from off-chip local oscillator 218 input. The output of the pre-amp 222 is mixed with the I-branch signal at the mixer 224 of the phase-lock-loop 250. The mixer 224 output is filtered by low pass filter 210 and passed into active filter 212. The transfer function of the active filter 212 can be controlled by programmable digital-to-analog converters (DACs). A voltage-to-current converter turns the voltage output of the active filter into a current signal 214 that controls the off-chip local laser output 216.

The output of the pre-amp 222 may also be mixed with the Q-branch signal at the mixer of the frequency-aided loop. This mixer output is low pass filtered 206 and then self-mixed to generate a DC level. When this DC level is low, the operational amplifier 226 (op-amp) will switch off the phase-lock-loop and engage the local laser frequency search. Once the frequency is close to the incoming signal frequency, the DC level will go high and the op-amp will switch on the phase-lock-loop.

Part of the local laser output is guided into an optical single-side-band modulator 270. The SSB modulator 270 consists of balanced nested Mach-Zehnder modulators. The phase differences of the modulators are tuned with three local thermal heaters, and are driven with I-Q local oscillator signals generated by a second second-order poly-phase shifter. In other embodiments, other polyphaser shifters or hybrid quadrature generators may be used instead of a second-order poly-phase shifter.

The input local laser signal 216 is frequency-shifted by the SSB modulator 270, and is further combined with the other branch of the incoming optical signal 202 to recover the baseband data signal by demodulator 260.

Figure 3:
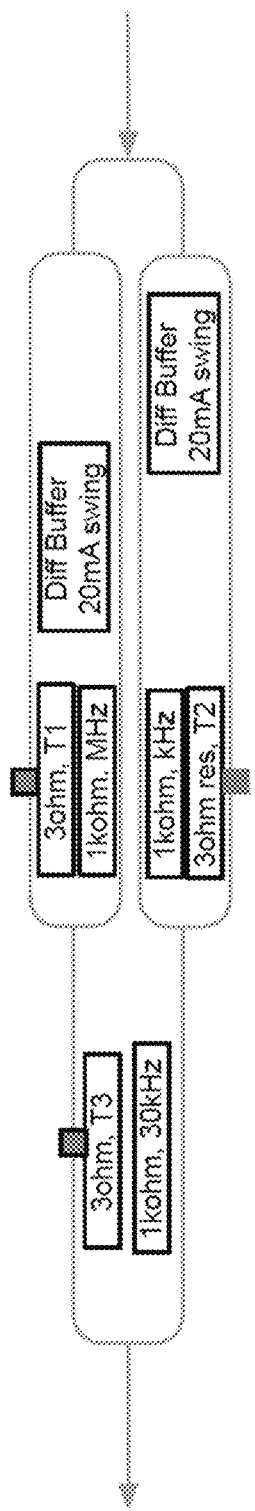
FIG. 3 is an example single-sideband (SSB) modulator.

FIG. 3 is an example single-sideband (SSB) modulator, for example the optical SSB modulator 270 of FIG. 2.

Figure 4:
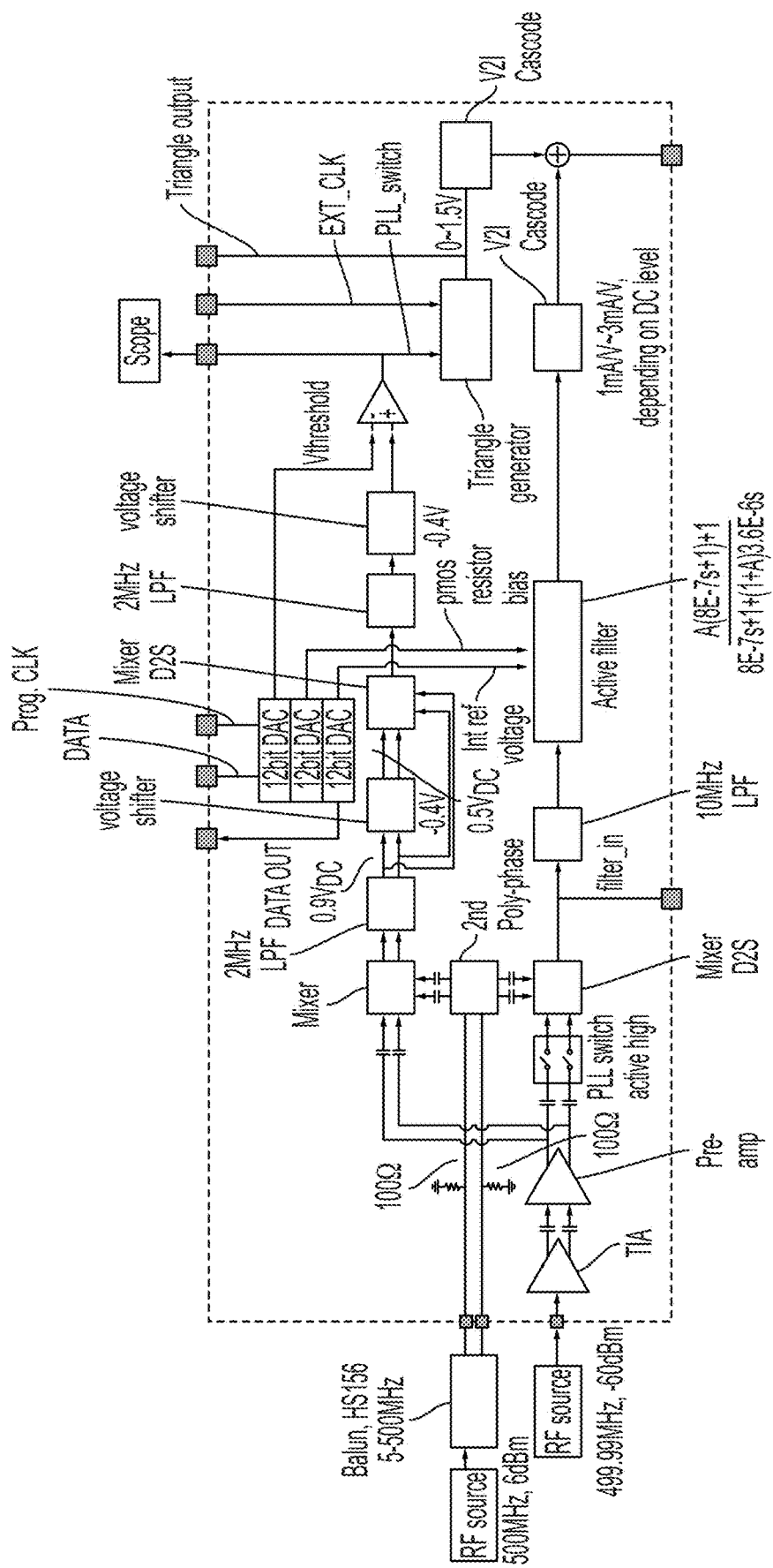
FIG. 4 is an example heterodyne phase-locked loop (PLL).

FIG. 4 is an example heterodyne phase-locked loop (PLL), for example the optical PLL 250 of FIG. 2.

EXEMPLARY EMBODIMENTS

The following embodiments are exemplary only and do not serve to limit the scope of the present disclosure or of the appended claims.

Embodiment 1. A method for optical communication, comprising: generating a phase difference signal with heterodyne or homodyne phase-locked-loop (PLL) from between an optical input signal and a local laser source; controlling the local laser source with the phase difference signal; demodulating the optical input signal using the local laser source as a carrier signal to generate a baseband output signal; and controlling the heterodyne or homodyne PLL and the demodulation with an electrical oscillator signal.

Embodiment 2. The method of Embodiment 1, further comprising: combining the optical input signal and the local laser source to generate a beating photocurrent at a diode in the heterodyne or homodyne PLL; and converting the beating photocurrent into a first electrical signal.

Embodiment 3. The method of Embodiment 2, further comprising: filtering the electrical oscillator with a polyphase filter or other hybrid quadrature generator to generating differential I and Q signals; mixing the first electrical signal with the differential I signal to generate a second electrical signal; filtering the second electrical signal with an controllable active filter to generate a third electrical signal; and generating the phase difference signal from the third electrical signal.

Embodiment 4. The method of Embodiment 3, further comprising: enabling or disabling the heterodyne or homodyne PLL based on the differential Q signal.

Embodiment 5. The method of any of Embodiments 1-4, wherein the demodulating comprises: modulating the local laser source with a single-sideband modulator to generate a modulated carrier signal; and demodulating the optical input signal with the modulated carrier signal.

Embodiment 6. The method of Embodiment 5, wherein the single side-band modulator includes balanced nested Mach-Zehnder modulators, and further comprising: filtering the electrical oscillator with a polyphase filter to generating differential I and Q signals; and tuning the phase differences of the Mach-Zehnder modulators with the differential I and Q signals.

Embodiment 7. The method of Embodiment 6, wherein the phase differences are tuned by driving thermal heaters or carrier injection based modulators with the differential I and Q signals.

Embodiment 8. A system for optical communication, comprising: a heterodyne or homodyne PLL controlling a local laser source based on input from the local laser source and an optical input signal; an optical demodulator for demodulating the optical input signals using the local laser source as a carrier signal to generate a baseband output signal; and an electrical oscillator configured to control the heterodyne or homodyne PLL and control the optical demodulator.

Embodiment 9. The system of Embodiment 8, further comprising: A photodiode configured to convert an optical combination of the local laser source and the optical input signal into a first electrical signal.

Embodiment 10. The system of Embodiment 9, further comprising: a second order polyphaser shift filter configured to generate differential I and Q signals from the electrical oscillator; and a controllable active filter to generate a third electrical signal by filtering a mixture of the first electrical signal and the differential I signal, wherein the third electrical signal controls the local laser source.

Embodiment 11. The system of Embodiment 10, further comprising: a switch for enabling or disabling the heterodyne PLL based on the differential Q signal.

Embodiment 12. The system of any of Embodiments 8-11, further comprising: a signal-sideband modulator configured to modulate the local laser source to generate a modulated carrier signal; a demodulator to demodulate the optical input signal based on the modulated carrier signal.

Embodiment 13. The system of Embodiment 12, wherein the signal-sideband modulator includes: balanced nested Mach-Zehnder modulators; and a second order polyphase shift filter configured to generate differential I and Q signals from the electrical oscillator.

Embodiment 14. The system of Embodiment 13, wherein the Mach-Zehnder modulators include thermal heaters that are driven by the differential I and Q signals.

Embodiment 15. A system comprising: a local laser source; an electrical oscillator; a second-order polyphaser shift filter configured to filter a signal from an electrical oscillator and generate differential I and Q signals; and a heterodyne or homodyne PLL controlled by the differential I and Q signals and configured to measure the phase difference between the local laser source and an optical input signal.

Embodiment 16. The system of Embodiment 15, wherein the local laser source is controlled by the phase difference, and further comprising: an optical demodulator for demodulating the optical input signals using the local laser source as a carrier signal to generate a baseband output signal.

Embodiment 17. The system of Embodiment 15, wherein the heterodyne or homodyne PLL includes a controllable active filter to generate a third electrical signal by filtering a mixture of the first electrical signal and the differential I signal, wherein the third electrical signal controls the local laser source.

Embodiment 18. The system of Embodiment 15, further comprising: a switch for enabling or disabling the heterodyne PLL based on the differential Q signal.

Embodiment 19. The system of Embodiment 15, further comprising: a photodiode configured to convert an optical combination of the local laser source and the optical input signal into a first electrical signal.

Embodiment 20. The system of Embodiment 19, further comprising a mixer configured to mix the first electrical signal with differential I signal to generate a second electrical signal.

What is claimed:
1. A method for optical communication, comprising:
generating a phase difference signal with heterodyne or homodyne phase-locked-loop (PLL) from between an optical input signal and a local laser source;
controlling the local laser source with the phase difference signal;
demodulating the optical input signal using the local laser source as a carrier signal to generate a baseband output signal; and
controlling the heterodyne or homodyne PLL and the demodulation with an electrical oscillator signal.
2. The method of claim 1, further comprising:
combining the optical input signal and the local laser source to generate a beating photocurrent at a diode in the heterodyne or homodyne PLL; and
converting the beating photocurrent into a first electrical signal.
3. The method of claim 2, further comprising:
filtering the electrical oscillator with a polyphase filter or other hybrid quadrature generator to generating differential I and Q signals;
mixing the first electrical signal with the differential I signal to generate a second electrical signal;
filtering the second electrical signal with a controllable active filter to generate a third electrical signal; and generating the phase difference signal from the third electrical signal.

4. The method of claim 3, further comprising:
enabling or disabling the heterodyne or homodyne PLL based on the differential Q signal.

5. The method of any of claims 1-4, wherein the demodulating comprises:
modulating the local laser source with a single-sideband modulator to generate a modulated carrier signal; and
demodulating the optical input signal with the modulated carrier signal.

6. The method of claim 5, wherein the single side-band modulator includes balanced nested Mach-Zehnder modulators, and further comprising:
filtering the electrical oscillator with a polyphase filter to generating differential I and Q signals; and
tuning the phase differences of the Mach-Zehnder modulators with the differential I and Q signals.

7. The method of claim 6, wherein the phase differences are tuned by driving thermal heaters or carrier injection based modulators with the differential I and Q signals.

8. A system for optical communication, comprising:
a heterodyne or homodyne PLL controlling a local laser source based on input from the local laser source and an optical input signal;
an optical demodulator for demodulating the optical input signals using the local laser source as a carrier signal to generate a baseband output signal; and
an electrical oscillator configured to control the heterodyne or homodyne PLL and control the optical demodulator.

9. The system of claim 8, further comprising:
A photodiode configured to convert an optical combination of the local laser source and the optical input signal into a first electrical signal.

10. The system of claim 9, further comprising:
a second order polyphaser shift filter configured to generate differential I and Q signals from the electrical oscillator; and
a controllable active filter to generate a third electrical signal by filtering a mixture of the first electrical signal and the differential I signal, wherein the third electrical signal controls the local laser source.

11. The system of claim 10, further comprising:
a switch for enabling or disabling the heterodyne PLL based on the differential Q signal.

12. The system of any of claims 8-11, further comprising:
a signal-sideband modulator configured to modulate the local laser source to generate a modulated carrier signal;
a demodulator to demodulate the optical input signal based on the modulated carrier signal.

13. The system of claim 12, wherein the signal-sideband modulator includes:
balanced nested Mach-Zehnder modulators; and
a second order polyphase shift filter configured to generate differential I and Q signals from the electrical oscillator.

14. The system of claim 13, wherein the Mach-Zehnder modulators include thermal heaters that are driven by the differential I and Q signals.

15. A system comprising:
a local laser source;
an electrical oscillator;
a second-order polyphaser shift filter configured to filter a signal from an electrical oscillator and generate differential I and Q signals; and
a heterodyne or homodyne PLL controlled by the differential I and Q signals and configured to measure the phase difference between the local laser source and an optical input signal.

16. The system of claim 15, wherein the local laser source is controlled by the phase difference, and further comprising:
an optical demodulator for demodulating the optical input signals using the local laser source as a carrier signal to generate a baseband output signal.

17. The system of claim 15, wherein the heterodyne or homodyne PLL includes a controllable active filter to generate a third electrical signal by filtering a mixture of the first electrical signal and the differential I signal, wherein the third electrical signal controls the local laser source.

18. The system of claim 15, further comprising:
a switch for enabling or disabling the heterodyne PLL based on the differential Q signal.

19. The system of claim 15, further comprising:
a photodiode configured to convert an optical combination of the local laser source and the optical input signal into a first electrical signal.

20. The system of claim 19, further comprising a mixer configured to mix the first electrical signal with differential I signal to generate a second electrical signal.

* * * * *